United States Patent

Plank et al.

[15] 3,676,330

[45] July 11, 1972

[54] ZEOLITE-CONTAINING CATALYST, SYNTHESIS AND USE THEREOF

[72] Inventors: Charles J. Plank, Woodbury; Edward J. Rosinski, Deptford, both of N.J.

[73] Assignee: Mobil Oil Corporation

[22] Filed: Dec. 15, 1969

[21] Appl. No.: 885,288

[52] U.S. Cl. ............................208/111, 208/120, 252/455 Z
[51] Int. Cl. .....................................C10g 13/02, B01j 11/40
[58] Field of Search............252/455 Z; 208/111, 120, 46 MS; 55/75

[56] References Cited

UNITED STATES PATENTS

| | | | |
|---|---|---|---|
| 3,234,028 | 2/1966 | Dunham, Jr. et al. | 252/455 X |
| 3,266,973 | 8/1966 | Crowley | 55/75 X |
| 3,267,022 | 8/1966 | Hansford | 208/111 |
| 3,269,934 | 8/1966 | Hansford | 208/111 |
| 3,394,075 | 7/1968 | Smith | 208/120 |

*Primary Examiner*—C. F. Dees
*Attorney*—Oswald G. Hayes, Andrew L. Gaboriault, Raymond W. Barclay and James F. Woods

[57] ABSTRACT

A method of preparing a composition comprising a crystalline zeolite and a porous matrix material which comprises coating at least a portion of the surface of at least one of the components selected from the group consisting of said zeolite and said porous matrix material with a solid or liquid coating material which is substantially retained during any subsequent processing steps prior to its positive intentional removal, which occurs after the compositing step, intimately compositing said zeolite with said matrix material and removing said coating material; the composition prepared therefrom and hydrocarbon conversion employing the composition as a catalyst.

44 Claims, No Drawings

ZEOLITE-CONTAINING CATALYST, SYNTHESIS AND USE THEREOF

CROSS-REFERENCE TO RELATED APPLICATION

This application is a continuation-in-part of copending application Ser. No. 758,713 of Sept. 10, 1968 now abandoned, entitled ZEOLITE-CONTAINING CATALYST, SYNTHESIS AND USE THEREOF.

BACKGROUND OF THE INVENTION

1. Field of the Invention

This invention relates to a process for intimately combining a crystalline zeolite material with a porous matrix. More particularly, this invention relates to a method of intimately combining a catalytically active zeolite material with a porous inorganic oxide matrix material to prepare an improved composition having greater attrition resistance and catalyst selectivity.

2. Discussion of the Prior Art

Zeolite materials have heretofore been intimately combined with porous matrix materials especially porous inorganic oxide matrixes. The purpose of combining the zeolite, which is thereafter converted to a catalytically active form, with the porous inorganic oxide matrix is to provide a hydrocarbon conversion catalyst useful especially in catalytic cracking which has greatly improved properties being, for example, far more active and selective than prior catalysts. Methods for preparing such combined zeolite-porous inorganic oxide matrix material are disclosed and claimed, for example, In U.S. Pat. No. 3,271,418 of Sept. 6, 1966, of C. J. Plank and E. J. Rosinski entitled "Catalytic Conver-sion of Hydrocarbons with a Crystalline Alumino-Silicate in a Silica-Alumina Matrix."

It has been found, however, that the catalyst properties can be improved and enhanced by an improved method in which the zeolite is intimately combined or composited with the porous matrix. The results provided by the new method include the production of a more catalytically active zeolite. Although not wishing to be bound by any theory, it is believed that when a zeolitic molecular sieve is combined with a porous inorganic oxide matrix, that there is produced more than one type of interaction. One type of interaction occurs when compositing is accomplished in an aqueous medium and is undesirable. This interaction is not observed, however, when the present process is performed, allowing production of a catalyst having improved catalytic activity including enhanced attrition resistance and steam stability.

SUMMARY OF THE INVENTION

Broadly, this invention contemplates a method of preparing a composition comprising a crystalline zeolite and a porous matrix material which comprises coating at least a portion of the external surface of said zeolite or said porous matrix material with a solid or liquid coating material which is substantially retained during any subsequent processing steps prior to positive removal, intimately compositing said zeolite with said matrix material and removing said coating material.

DISCUSSION OF PREFERRED EMBODIMENTS

The purposes of this invention can be accomplished by coating at least the external surfaces of the zeolite or matrix particles with any material which is sufficiently adherent to said surfaces that it is substantially retained during subsequent processing steps carried out prior to its intentional removal which occurs after the step of compositing said zeolite with said matrix. The quantity of coating material added should be generally greater than about 1 percent by weight based on the weight of the zeolite particles. Generally, we prefer to add less than about 30 percent by weight based on the weight of the zeolite.

It has been found that a preferred manner of introducing a coating material into the zeolite treated in accordance with the present invention is to contact the zeolite with a fluid medium, e.g., a solution or suspension, preferably an aqueous solution or suspension, containing a substance which can be converted to coke or to other carbonaceous material. For example, one can contact and coat the zeolite being treated with a carbonaceous material in colloidal form (e.g., starch) maintained in suspension in a liquid medium such as water. After contact, the material is treated to yield coke or other carbonaceous material which forms an effective coating on the zeolite and prevents any adverse sieve-matrix interaction. Particularly good results have been found by this in situ coating procedure employing various sugars and starches. In this instance, an aqueous solution of a sugar is contacted with the zeolite being treated. The aqueous solution introduces the dissolved sugar into the zeolite pores and places the same on its surface. The zeolite so treated is then heated in a substantially non-oxidizing atmosphere at a temperature between the decomposition point of the sugar and the decomposition point of the zeolite, preferably between 300° and about 1,200° F. This causes the sugar to be decomposed into coke or similar carbonaceous material. The carbonaceous material is intimately associated with the zeolite, protects the same and facilitates zeolite dispersion within the matrix when the same is composited with the amorphous matrix material employed. When starch is employed, the operation is substantially the same with the exception that the starch is applied as an aqueous suspension. Nevertheless, the starch is an effective coating agent and when heated in a substantially non-oxidizing atmosphere between its decomposition point and the decomposition point of the zeolite, it yields carbonaceous material which functions to provide excellent dispersion of the zeolite in the porous amorphous matrix without any adverse effects. Hydrocarbon conversion runs, notably cracking, show that composite catalysts prepared with a saccharide, e.g., monosaccharide, disaccharide, or polysaccharide are superior in terms of activity and selectivity and compare favorably with other coating procedures contemplated herein.

Monosaccharides contemplated for use in the present invention include glucose, fructose, mannose, galactose, aldohexose, aldopentose, glyceraldehyde, allose, altrose, talose, gulose, idose, arabinose, ribose, eylose, lyxose, erythrose, threose, hexose and rhamnose. Disaccharides which are useful in the present invention include sucrose, lactose, maltose and cellobiose. Polysaccharides which can be employed include cellulose, hemicelluloses, chitin and, especially, starch. Other polysaccharides not specifically mentioned herein can be used provided they can be treated while present on the zeolite to yield a carbonaceous coating agent under conditions wherein the treatment does not adversely affect the zeolite.

The zeolite particles to be coated should preferably have particle diameters averaging below about 10 $\mu$, preferably below about 5 $\mu$.

The technique of the present invention is especially useful in preparing hydrocarbon cracking catalysts of the fluid size, i.e., composite zeolite-matrix catalysts of a size such that they are suitable for use in fluidized bed processes wherein the catalyst particles themselves move through the catalytic cracking unit. This is particularly true for composite catalysts prepared employing sugar or starch as an in situ source of carbonaceous coating material. Higher yields and improved selectivities have been found when starches or sugars are employed in the coating operation.

In another preferred embodiment, this invention contemplates a method of preparing a catalyst comprising a crystalline zeolite and a porous matrix material which process comprises filling at least 10 percent of the available pore volume of a catalytically active zeolite with a hydrophobic material, compositing said zeolite with a porous inorganic oxide matrix material and removing said hydrophobic material. Preferably, at least 50 percent and still more preferably at least 75 percent of the pore volume available to the hydrophobic material is filled with said hydrophobic material. As nearly as possible, most of the individual particles should be at least surface coated.

The method of the present invention is similarly applicable to the preparation of compositions comprising a porous amorphous material such as a porous amorphous inorganic oxide catalyst which is to be dispersed in a matrix. These porous amorphous inorganic oxides catalysts include catalysts containing silica, alumina, zirconia, beryllia, titania, magnesia, thoria and the like as well as combinations of any of these such as silica-alumina, silica-magnesia, silica-thoria. Ternary compositions such as silica-alumina-thoria, silica-alumina-zirconia, silica-alumina-magnesia and silica-magnesia-zirconia are also contemplated. These compositions can be disposed in any of the matrix materials disclosed hereinafter. In certain instances, the catalytic composition will be dispersed in a matrix composition having the same or similar chemical properties. Nevertheless, the dispersing method of the present invention provides better dispersion of the catalytic material in the matrix and improves the composition's overall attrition resistance.

Zeolites which can be coated in accordance with this invention include both natural and synthetic zeolites. These zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. Suitable synthetic zeolites which can be treated in accordance with this invention include zeolites X Y, A, L, ZK–4, B, E, F, H, J, M, Q, T, W, Z, alpha and beta. The term "zeolites" as used herein contemplates not only aluminosilicates but substances in which the aluminum is replaced by gallium and substances in which the silicon is replaced by germanium. Generally, these have a port size greater than 3 angstroms. Those most preferred are the ones having port sizes greater than 4A so that coating materials may penetrate said pore openings.

Porous matrix materials which can be composited with any of the foregoing zeolites, as well as other zeolites not specifically mentioned above, include porous carbon black; porous metals especially porous aluminum, clays, such as kaolinites, montmorillonites, both natural and chemically or thermally treated, gels, and porous inorganic oxides including porous alumina gels and gels rich in alumina and siliceous hydrogels especially those containing another metal oxide. Such siliceous hydrogels include, for example, silica-alumina, silica-magnesia, silica-zirconia, silica-thoria, silica-beryllia, silica-titania, as well as ternary combinations such as silica-alumina-thoria, silica-alumina-zirconia, silica-alumina-magnesia and silica-magnesia-zirconia. Particular preference is accorded cogels of silica-alumina, silica-zirconia and silica-alumina-zirconia. In the foregoing gels, silica is generally present as the major component and the other oxides of metals are present in minor proportion. Thus, the silica content of the siliceous gel matrix utilized in the catalyst described herein will generally be within the approximate range of 55 to 100 weight percent with the metal oxide content ranging from zero to 45 weight percent. Siliceous hydrogels utilized herein and hydrogels obtained therefrom can be prepared by any method well known in the art, such as, for example, hydrolysis of ethyl orthosilicate, acidification of an alkali metal silicate wherein either the acid solution or the alkali metal silicate solution can contain a compound of a metal, the oxide of which it is desired to cogel with silica. The relative proportions of finely divided crystalline aluminosilicate and siliceous gel matrix can vary widely with the zeolite content ranging from about 1 to about 90 percent by weight and more usually, from about 2 to 80 percent and, particularly where the composite is prepared in the form of beads, in the range of about 2 to about 50 percent by weight of the composite.

Materials useful as coating materials for either the porous matrix material or the zeolite include both solids and liquids. Among the solids may be mentioned polymers, such as polystyrene, sulfur, wax and other high molecular weight compounds melting above about 40° C. and coke. Of these solids, wax and coke are preferred, especially the latter, because it can be readily removed subsequent to the compositing operation and is available at low cost. They can be removed from the composite simply by burning or other similar suitable thermal treatment. Liquids which can be used are generally those which adhere to the surface to be coated and are not substantially removed during the subsequent compositing and/or ion exchange steps. For example, a heavy gas oil, especially a waxy gas oil, can be used for this purpose. Likewise, an organic polymer or polymerizable material can be used. The coating material, whether solid or liquid, must be such that it is substantially retained during any subsequent wet-processing step, prior to its intentional removal, such as during the compositing or ion exchange steps, as it is important that during these steps the zeolite and the matrix remain out of direct contact with one another to avoid the aforementioned type of sieve-matrix interaction. A liquid coating material can, of course, be one which is converted to a solid coating material as, for example, by coking, freezing, polymerization and the like. Generally, the compositing and ion exchange steps are employed using an aqueous medium and, in that event, the coating material is hydrophobic. However, if the compositing and/or ion exchange steps are performed in a different solvent medium, then the coating material chosen must be such that it does not substantially dissolve in that solvent and thus be removed from either the sieve or the matrix.

The zeolite can be composited with the porous matrix material while in a catalytically active form such as a form wherein a major portion of the alkali metal cations have been replaced by ion exchange with a metal or mixture of metals of Groups IB – VIII of the Periodic Table. Suitably, the zeolite can be in the rare earth exchange form. Additionally, if desired, it can be in a hydrogen form, ammonium form, alkylammonium form, arylammonium form, or a form resulting from thermal treatment of one of these forms at a temperature of about 700° F. for a period of at least one minute, generally at least 10 minutes, up to a temperature of about 1,400° F. Particularly preferred zeolites are those in which the alkali cations have been largely replaced in part by a metal, especially a rare earth metal, and in part with hydrogen or a hydrogen precursor.

The compositing operation can be performed in any suitable manner especially those means disclosed in the U.S. Pat. No. 3,140,249. The zeolite can be milled with the porous matrix material or can be formed by introducing coated zeolite into a hydrous oxide sol or hydrogel (e.g., a siliceous sol or alumina-containing sol or hydrogel) during the process of forming said sol or hydrogel. Said sol would then be formed into a hydrogel which is thereafter calcined to provide the porous matrix structure. If desired, the hydrogel can be formed, together with the coated zeolite into spheroidal particles by any feasible process, such as methods described in patents to Marisic, for example, U.S. Pat. No. 2,384,946. Broadly, such methods involve introducing globules of hydrosol into a column of water-immiscible liquid; for example, an oil medium wherein the globules of hydrosol set to a hydrogel and subsequently pass into an underlying layer of water from which they are sluiced to further processing operations such as base-exchange, water-washing, drying and calcining. Larger size spheres are ordinarily within the range of from about one sixty-fourth to about one-fourth inch in diameter, whereas smaller size spheres, which are generally referred to as micro-spheres, are with-in the range of from about 10 to about 100 microns in diameter. The latter can also be prepared by spray drying sols or slurries. The use of the spherically shaped particles is of particular advantage in hydrocarbon conversion processes, including the moving catalyst bed processes and the fluidized processes in which the spheroidal gel particles are subjected to continuous movement. As applied to the stationary bed, spheroidal catalyst particles provide effective contact between the reactants and the catalyst by avoiding channeling. It is accordingly a preferred embodiment of the present invention to prepare the described catalyst in the form of spheres, although it is to be realized that the method of the invention can also be employed in obtaining a mass of catalyst which can, thereafter, be broken up into particles of desired size. Likewise, the method described herein can be used for the preparation of the present catalysts in the form of particles of any other desired size of shape.

While, for the production of spheroidal catalyst particles by the aforementioned technique, initial formation of a hydrosol which sets upon lapse of a short interval of time to an all embracing bead-form hydrogel is desirable, it is within the purview of this invention to also employ, particularly where the catalyst is prepared in a form other than the spheroidal shape, a matrix comprising a gelatinous hydrous oxide precipitate with varying degrees of hydration or a mixture of a hydrogel and such gelatinous precipitate. The term gel, as utilized herein, is intended to include hydrogel, gelatinous precipitates and mixtures of the two. Zeolite addition may occur before, during or after gel formation.

As indicated hereinabove, the crystalline alkali metal zeolite can be ion exchanged either before or after intimate admixture with the porous matrix material. If performed subsequent to the compositing step, the ion exchange technique will depend upon the condition of the zeolite and the extent to which the pores are filled. Base exchange is affected by treatment with a solution of a pH sufficiently high that it does not destroy the crystallinity of the zeolite. This varies depending on the silica/alumina ratio of the zeolite. The solution will, of course, contain an ion capable of replacing an alkali metal cation. The exchangeable alkali metal content of the final catalytic composite should be less than about 1 and preferably less than about 0.5 percent by weight. The exchangeable alkali metal content of the final catalyst is determined by the test set forth in U.S. Pat. No. 3,271,418. The base exchange solution can be contacted with the zeolite in the form of a fine powder, a compressed pellet, extruded pellet, spheroidal bead or other particle shape. Base exchange required for introducing the necessary re-placing ions is carried out on the combined zeolite matrix com-posite for a sufficient period of time and under appropriate tem-perature conditions to replace at least 75 percent of the exchangea-ble alkali metal originally contained in the zeolite and to effectively reduce the exchangeable alkali metal content of the result-ing composite to below about 1 weight percent. It is contemplated that any ionizable compound of a metal capable of replacing the alkali metal can be employed for base exchange either alone or in combination of other ions. These metals are generally metals of Groups IB – VIII of the Periodic Table, especially metals of Groups II and VIII of the Periodic Table and manganese. The composition can have at least a portion of its alkali metal content converted to a hydrogen form by treating the same with inorganic or organic acids. Additionally, the finished composite material can be converted into an ammonium form utilizing an aqueous solution of an ammonium salt in which the ammonium cation ionizes and replaces alkali metal ions in the composite. Such solutions include ammonium hydroxide and ammonium sulfate. The ammonium form is converted to the hydrogen form by heating the same at a temperature of at least about 500° F. causing evolution of ammonia and retention of a proton in the composition.

The crystalline zeolite porous matrix composite especially in a metal, other than alkali metal, hydrogen, ammonium, alkyl-ammonium or arylammonium form can be activated by thermal treatment. This treatment is generally performed by heating one of these forms at a temperature of at least 700° F. for at least 1 minute and generally need not be longer than 20 hours. While superatmospheric pressure can be employed during the thermal treatment, atmospheric pressure is generally used for reasons of convenience. It is frequently preferred to perform the thermal treatment in the presence of moisture, although the presence of moisture is not necessary. The thermal treatment can be performed at a temperature up to about 1,750° F. care being taken to stay below the decomposition point of the particular zeolite. The thermally treated product is particularly useful in the catalysis of certain hydrocarbon conversion reactions.

The method in which the coating material is removed after either the compositing or ion exchange step depends upon the nature of the coating material employed. As indicated above, when coke is used to coat the sieve or matrix material and fill at least 10 percent of the pores, it can be removed, simply, by burning the resultant composite. When a hydrophobic liquid such as a heavy gas oil is employed as a coating material, it is suitably removed by burning or by use of a solvent of the same. Additionally, depending upon the nature of the coating material, it can be removed by cracking, thermal treatment or sublimation. This also applies when materials such as paraffins and polymers are employed as coating materials.

While one of the primary advantages of the present process resides in eliminating adverse zeolite-inorganic oxide matrix interaction, a secondary effect of the coating procedure is to permit the crystalline zeolite to be more finely subdivided, as by milling, and/or maintained in a finer state of subdivision in that coating prevents the zeolite particles from reagglomerating during the compositing step. This provides a composite catalyst which, when a coating material is removed, has the zeolite particles more finely dispersed and distributed within the porous matrix and leads to greatly improved attrition resistance. Thus, the process of this invention is useful in dispersing crystalline zeolites even in porous matrixes which are not characterized by any particular matrix-sieve interaction. In this category, there are porous metals, such as porous aluminum, and porous carbon black.

In order to more fully illustrate the nature of this invention and the manner of practicing the same, the following examples are presented.

Except where otherwise noted, the catalytic properties of the subsequent examples were determined by cracking a Mid-Continent Wide Range gas oil (whose properties are given in Table I) in a static bed unit at about 900° F. at atmospheric pressure, a space velocity (LHSV) = 4 and a catalyst/oil ratio of 1.5 for a 10 minute period.

TABLE 1

Properties of Mid-Continent Gas Oil Charge Stock

| Wide Range Gas Oil | | |
|---|---|---|
| Vol.% on crude | | 44–89 |
| Gravity, API | | 29.6 |
| Aniline No., °F. | | 181 |
| S, wt.% | | 0.52 |
| N, wt.% | | 0.046 |
| Pour point, °F. | | 80 |
| Carbon residue, wt.% | | 0.19 |
| Ni, p.p.m. | | 0.17 |
| Cu, p.p.m. | | 0.46 |
| V, p.p.m. | | 0.26 |
| $H_2$, wt.% | | 12.77 |
| | Distillation, °F. | |
| | ASTM | V.A.[a] |
| IBP | 497 | 458 |
| 5%, vol. | 552 | 551 |
| 10% | 570 | 577 |
| 20% | 593 | 601 |
| 30% | 615 | 630 |
| 40% | 640 | 665 |
| 50% | 668 | 705 |
| 60% | 695 | 752 |
| 70% | 713 | 798 |
| 80% | 732 | 854 |
| 90% | 740 | 919 |
| 95% | — | 947 |
| EP | 750 | — |

[a]Vacuum assay corrected to 760 mm.

EXAMPLE 1

A. A rare earth exchanged Linde zeolite Y (REY)-clay (kaoline) composite was prepared by ball milling the REY with the clay for 4 ½ hours. Its preparation specifics are given in subparagraph B below. The composite contained 10 percent by weight REY having a sodium content of 0.9 percent by weight. It was then dried, pelleted and crushed to 4 × 10 Tyler mesh particles.

B. A second composite containing silica was prepared by first ball milling another portion of the same rare earth exchanged zeolite Y with 10 percent by weight silica as hydrogel for 3 ½ hours and the combining the resultant composite with kaolin clay and ball milling again. The rare earth exchanged zeolite Y component in this preparation was made from a sodium form of Linde zeolite Y byexchanging with $RECl_3 \cdot 6H_2O$ to a low residual sodium content. This was performed in a laboratory by exchanging semi-continuously with a 10 percent $RECl_3 \cdot 6H_2O$ at about 180° F. to about 2-3 percent sodium and then drying at 270° F. The dried material was then re-exchanged with $RECl_3 \cdot 6H_2O$ to a residual sodium content of 0.90 weight percent sodium. In addition, this rare earth exchanged zeolite Y contained 17.2 weight percent $(RE)_2O_3$, 18.9 weight percent $Al_2O_3$ and 61.7 weight percent $SiO_2$. This rare earth exchanged zeolite Y (REY) was calcined for 10 hours at 1,000° F. prior to use in the composite. In preparing the composite catalyst, 60 grams of the above REY was blended with 571 grams of silica hydrogel having 10.5 weight percent $SiO_2$(determined at 1,000° F.) and 1342 cc. $H_2O$ in a high shear blendor followed by a 3 ½ hour ball milling in a 1.1 gallon mill containing 8 pounds of stones. To this slurry was then added 552 grams McNamee clay (a kaolin clay 87 percent solid determined at 1,000° F.) and milled an additional hour. This slurry was then air dried at 230° F. overnight for about 20 hours, pelleted and sized to 4 × 10 Tyler mesh and calcined for 10 hours at 1,000° F. followed by steaming at 1,200° F. with steam at 15 psig. for 72 hours. Physical properties and evaluation data are summarized in Table 2 below.

C. In a manner similar to the procedure set forth in subparagraph B, a REY-silica/alumina-clay composite catalyst was prepared. The amount of silica/alumina was 10 percent by weight based on the weight of the final composite.

D. In the manner of subparagraph B, a REY-alumina-clay composite was prepared.

All four catalysts were tested for physical properties after treating with 100 percent steam for 72 hours at 1,200° F. and 15 psig. as well as after treating with 5 percent steam for 24 hours at 1,575° F. and atmospheric pressure. Catalytic cracking results are given in the table below.

TABLE 2

REY-Clay (Kaolinite)—Hydrogel Interaction (10% Rey)

| Catalyst | A | B | C | D |
|---|---|---|---|---|
| | Steamed 72 hours/1200°F/15 psig. | | | |
| Hydrogel (10%) | None | $SiO_2$ | $SiO_2/Al_2O_3$ | $Al_2O_3$ |
| Surface area (m²/g) | 62 | 65 | 69 | 63 |
| Crystallinity (% REY) | | 9.6 | 11.0 | 8.3 |
| Conversion (Vol. %) | 63.4 | 61.1 | 59.1 | 62.9 |
| $C_5$ + Gasoline (Vol.%) | 55.6 | 53.7 | 50.0 | 54.6 |
| | Steamed 24 hours/5% steam/ 1575°F/1 atm | | | |
| Surface area (m²/g) | 48 | 54 | 52 | 51 |
| Crystallinity (% REY) | 4.5 | 4.1 | 4.1 | 4.6 |
| Conversion (Vol.%) | 59.6 | 49.6 | 49.4 | 53.5 |
| $C_5$ + Gasoline (Vol.%) | 50.4 | 43.6 | 42.5 | 46.6 |

The effects of the hydrogels on the catalytic results are quite obvious particularly under the more severe steaming conditions and especially with the siliceous hydrogels.

In order to improve the catalytic conversion of the gas oil being cracked using a composite catalyst and to improve the selectivity of the cracking to $C_5$ + gasoline, several different composite catalysts were prepared employing the coating procedure of this invention. First, direct comparison was made with the catalysts of Table 2 employing the same rare earth exchanged Linde zeolite Y; but, in this case, the REY had a substantial portion of its pore volume filled with coke. The amount of coke on the aluminosilicate was about 15–18 percent by weight. Deposition of the coke on zeolite was achieved by saturating the aluminosilicate with a gas oil then heating it in a flask under a nitrogen blanket at 700° F. for 2–3 hours. The coated zeolite was then ball milled in water slurry with the indicated hydrogel-clay. The clay that was employed was a kaolinite clay known as McNamee Clay.

In Table 3, set forth below, the cracking results of catalysts prepared by pre-coking the zeolite and the catalyst prepared without pre-coking the zeolite are set forth. The hydrocarbon charge was Mid-Continental gas oil and the catalysts were steamed for 72 hours at 1,200° F. and 15 psig.

TABLE 3

Effects of Pre-coking on REY-Hydrogel Interaction (Steamed 72 hours/1200°F./15 psig.)

| Catalyst | B | 2B | C | 2C | D | 2D |
|---|---|---|---|---|---|---|
| Hydrogel Used (10%) | $SiO_2$ | | $SiO_2$—$Al_2O_3$ | | $Al_2O_3$ | |
| Pre-Coked | No | Yes | No | Yes | No | Yes |
| Surface Area (m²/g.) | 65 | 69 | 69 | 71 | 63 | 66 |
| Conversion (Vol.%) | 61.1 | 65.6 | 59.1 | 64.8 | 62.9 | 70.5 |
| $C_5$ + Gasoline (Vol.%) | 53.7 | 55.8 | 50.0 | 54.4 | 54.6 | 58.1 |

The important result noted from the table above is the very substantial gain in catalytic activity caused by the pre-coking operation. The amount of activity gained is approximately equivalent to an increase of 50 percent in sieve effectiveness. This estimate is based on the change of conversion obtained when the amount of REY zeolite used in a conventional sieve-matrix composite catalyst was increased from 7.5 percent to 13.3 percent by weight. This increase in conversion was from 59.6 percent to 66.4 percent. Thus, at the 60 percent conversion level, an increase of about 1 percent in conversion results from a 1 percent higher sieve content.

EXAMPLE 2

In the manner of Example 1 D, a rare earth-exchanged zeolite X-alumina-kaolinite composite catalyst was similarly prepared without pre-coking. In Table 4 below, it is compared with a catalyst prepared with the pre-coking step. The catalysts were steamed for 72 hours at 1,200° F. and 15 psig.

TABLE 4

Effect of Pre-coking on REX-$Al_2O_3$ Interaction (Steamed 72 hours/1,200° F/15 psig)

| Pre-coked | No | Yes |
|---|---|---|
| Surface Area (m²/g) | 55 | 53 |
| Conversion (Vol. %) | 42.3 | 50.0 |
| $C_5$ + Gasoline (Vol.%) | 37.0 | 42.9 |

From the above results, it can be seen that a marked improvement is obtained both in conversion and in selectivity when the catalyst is prepared by pre-coking the zeolite prior to the compositing step.

The effects of presaturating the zeolite crystals to be used in the composite catalysts comprising silica-alumina gel were determined in several different series of tests.

EXAMPLE 3

In the first group, all were prepared as "bead-type" catalysts from the same batch of rare earth exchanged zeolite Y (REY). All contained 7.6 percent REY calcined for 10 hours at 1,000° F. and 40 percent $\alpha$ $Al_2O_3$ fines (about 4 microns) which had been calcined at a temperature of about 1,200° C. and is known as A-3 alumina and the remainder (matrix) was a silica-alumina gel containing 94 percent $SiO_2$ and 6 percent $Al_2O_3$, the gel bead being prepared at 8.5 pH.

In this group of catalysts, three different types of preparations were carried out. The differences are defined by the method of treating the REY. These treatments were as follows:
1. standard - no treatment after the rare earth exchange drying and calcining,
2. REY + coking with wide range Mid-Continent gas oil,
3. REY + heavy waxy gas oil.

The coking with the wide range Mid-Continent gas oil was performed by contacting the zeolite crystals with an excess of the same and then heating the material in a flask under a nitrogen blanket at 700° F. for 2–3 hours. When heavy gas oil was employed as the coating material, one part of gas oil by weight was added to one part of zeolite at 200° F. It was then mixed with an A-3 alumina fines slurry and charged to a ball mill. Milling was continued for 24 hours. All three of these bead preparations were split into two batches. The first was base exchanged by continuous flow of one-half volume of solution per volume of hydrogel per hour with 1.4 weight percent solution of $(NH_4)_2SO_4$ and the second with solutions containing 1 weight percent $Al_2(SO_4)_3·18 H_2O$ and 0.2 weight percent $(NH_4)_2SO_4$. Each was water washed until free of soluble cations, dried 20 hours at 450° F., and calcined for 10 hours at 1,000° F. The following describes in detail the preparation of the above-described catalysts.

CATALYST 3A

The rare earth exchanged zeolite Y (REY) component of this catalyst was prepared by base exchanging 7.34 pounds (44.5 percent solids at 1,000° F.) sodium form of Linde Y (Na 9.97 weight percent, $Al_2O_3$, 20.7 weight percent, $SiO_2$ 64.9 weight percent) with 1.21 pounds $RECl_3·6 H_2O$ in 25.50 pounds water for 1 hour at 200° F., water washing with 2,600 ml. water and oven drying at 450° F. in air overnight (about 20 hours). This contact was repeated again giving a final residual sodium of 1.5 weight percent. Prior to use in the bead catalyst preparation, the REY component was calcined for 10 hours at 1,000° F.

The bead catalyst preparation employing the listed solutions was as follows:

Silicate Solution
Solution A
6.96 lbs. of Q-Brand sodium silicate (28.9 weight percent $SiO_2$, 8.9 weight percent $Na_2O$, 62.2 percent $H_2O$) 1.00 lbs. of water
Solution B
0.31 lbs. REY (1.5 percent Na) calcined for 10 hours at 1,000° F.
1.64 lbs. $A_3$-$Al_2O_3$ milled for 24 hours in 21.4 percent slurry
6.02 lbs. water
5.3 g. of a dispersant compound of a salt of lignin sulfonic acid containing 11 weight percent $Na_2O$, 0.4 weight percent CaO and 0.5 weight percent MgO and having a pH between 7.0 and 7.5, to disperse the fines.

Solution B was mixed into Solution A forming a mixture having Specific Gravity 1.264 at 76° F.
Acid Solution
57.1 lbs. of water
4.23 lbs. of $A_{;2}Al_4)_3·18 H_2O$
1.98 lbs. of $H_2SO_4$ 97 percent
Sp. Gr. 1.056 at 79° F.

These two solutions were mixed together through a mixing nozzle using 396 cc per min. of silicate solution at 70° F. and 358 cc per min. of acid solution at 42° F. The resulting hydrosol had a 8.5 pH and gelled into hydrogel in 2.4 seconds at 67° F. Gelation was carried out in a conventional bead-forming process to produce spheroidal hydrogel particles.

The composition of the resulting catalyst (on a 1,000° F. calcined basis) at the point of forming was calculated to be:
3.0 wt. % $Al_2O_3$ matrix 94.2 weight percent
49.4 wt. % $SiO_2$ $SiO_2$—5.8 weight percent $Al_2O_3$
7.6 REY
40.0 wt. % $A_3Al_2O_3$ The processing of this catalyst first involved base exchange continuously with a 1.4 weight percent $(NH_4)_2SO_4$ solution at room temperature over a 24 hour period. The solution flow rate was about one-half volume per volume of catalyst per hour. Following the base exchange, the hydrogel was water washed essentially free of sulfate ion, dried 20 hours at 450° F., followed by calcination in air for 10 hours at 100° F., and steamed for 24 and 72 hours at 1,200° F. with steam at 15 psig. Physical, chemical and catalytic properties of the catalyst are summarized in Table 5 below.

Catalyst 3B was prepared using the same bead hydrogel prepared above in 3A, but base exchanging with a solution containing 1.0 weight percent $Al_2(SO_4)_3·18H_2O$ and 0.2 weight percent $(NH_4)_2SO_4$. Further, processing, activation and evaluation was the same as discussed above and also summarized in Table 5 below.

Catalysts 3C and 3D were prepared by the same bead preparation method discussed in the previous two samples, 3A and 3B differing only in that the same REY component was coked by slurrying with wide-range Mid-Continent gas oil and heated at 750° F. until all volatile components were removed. This coked REY was dispersed in the silicate solution as described above.

Catalyst 3C was base exchanged in the same manner as 3A while Catalyst 3D was base exchanged in the same manner as Catalyst 3B.

Catalysts 3E and 3F were prepared in a manner quite similar to that discussed under 3A and 3B differing only in that the same calcined REY was saturated with a waxy gas oil. This REY saturated with gas oil was then ball-milled with an aqueous slurry of A-3 alumina fines, previously described, prior to dispersion in the silicate solution.

These catalysts were tested catalytically after being steamed both 24 and 72 hours with 100 percent steam at 1,200° F. and 15 psig. The catalytic cracking results of Mid-Continent gas oil are compared in Table 5. In addition, some were tested for the cracking of a recycle stock whose properties are given in Table 6. The catalytic data are given in Table 7.

Catalyst activities as measured in the cracking of wide range Mid-Continent gas oil (Table 5) vary substantially with the method of preparation. The catalysts prepared using the pretreating technique—coking or saturation with heavy gas oil—show definite advantage in initial activity and also stability to steam treatment. This is shown by comparing Catalyst 3B with Catalyst 3F in Table 5. In addition, Catalyst 3D was substantially better in terms of conversion and selectivity than Catalyst 3B in cracking the catalytic cycle stock as shown in Table 7. After steaming for 72 hours, Catalyst 3D gives a 4.4 percent increase in conversion and a 3.9 percent increase in $C_5$ + Gasoline at substantially the same coke yield. This represents a very substantial selectivity gain.

It should be pointed out here that coking is representative of processes involving coating the zeolite particles with an organic polymeric material. Other organic polymers or polymerizable compounds will work as well.

The various percents crystallinity expressed above, express the percent crystalline zeolite component present in the composite catalyst. These crystallinities are determined from comparisons of X-ray diffraction patterns of the above preparations with X-ray diffraction patterns of composites having known zeolite content.

| | | |
|---|---|---|
| IBP | 516 | 401 |
| 5% | 583 | 599 |
| 10% | 606 | 617 |
| 20% | 612 | 630 |
| 30% | 623 | 637 |
| 40% | 628 | 643 |

TABLE 5.—CRACKING MID-CONTINENT GAS OIL

| | Catalyst | | | | | | | | | | | |
|---|---|---|---|---|---|---|---|---|---|---|---|---|
| | 3A | | 3B | | 3C | | 3D | | 3E | | 3F | |
| Steaming hours [1] | 24 | 72 | 24 | 72 | 24 | 72 | 24 | 72 | 24 | 72 | 24 | 72 |
| Composition: | | | | | | | | | | | | |
| Na, weight percent | 0.08 | | 0.08 | | 0.08 | | 0.09 | | 0.08 | | 0.09 | |
| (RE)$_2$O$_3$ weight percent | 1.55 | | 1.38 | | 1.66 | | 1.42 | | 1.47 | | 1.38 | |
| Physical properties: | | | | | | | | | | | | |
| App. Dens. g./cc. | 0.72 | | 0.80 | | 0.73 | | 0.77 | | 0.77 | | 0.83 | |
| Surface area, m./g. steamed | 116 | 96 | 100 | 75 | 116 | 96 | 111 | 95 | 113 | | 102 | 89 |
| X-ray analysis: | | | | | | | | | | | | |
| Crystallinity calcined | 9.5 | | 13.1 | | 9.1 | | 8.3 | | 7.9 | | 7.1 | |
| Crystallinity percent steamed | 5.9 | | 6.1 | | 9.1 | | 7.9 | | 7.5 | | 7.5 | |
| Conversion, volume percent | 49.8 | 48.5 | 56.1 | 51.6 | 58.9 | 57.7 | 61.1 | 59.3 | 55.7 | 57.0 | 56.9 | 56.9 |
| C$_5$ plus gasoline, volume percent | 42.9 | 40.2 | 48.9 | 45.7 | 51.1 | 49.8 | 52.4 | 51.5 | 48.8 | 48.8 | 49.9 | 49.6 |
| Total C$_4$'s, volume percent | 10.0 | 9.3 | 10.9 | 9.0 | 11.5 | 11.1 | 12.7 | 11.0 | 10.5 | 11.1 | 10.8 | 10.6 |
| Dry gas, weight percent | 4.4 | 5.4 | 5.1 | 5.4 | 5.0 | 5.1 | 5.6 | 5.4 | 4.7 | 5.1 | 4.8 | 5.4 |
| Coke, weight percent | 1.5 | 1.3 | 1.1 | 1.2 | 1.2 | 1.3 | 1.3 | 1.4 | 1.3 | 1.4 | 1.4 | 1.3 |
| LSA (attrition resistance) seconds required for 50 percent weight fines | 270 | | 413 | | 265 | | 465 | | 765 | | 1,310 | |

[1] With steam at 15 p.s.i.g. and at 1,200° F.

REY-containing reference composites were prepared by blending known amounts of REY with the same type of amorphous material. The REY used in these reference composites was prepared from a sodium Y prepared according to U.S. Pat. No. 3,130,007 which was water washed at 180° F. to pH 11, base exchanged with 10 weight percent RECl$_3$·6H$_2$O aqueous solution for six 1-hour contacts. The exchanged product was filtered, water washed at 180° F. until chloride free, dried at 250° F. in air, base exchanged using 10 weight percent RECl$_3$·6H$_2$O aqueous solution for four 1-hour contacts. The product was filtered, washed chloride free, dried at 230° F. and calcined for 10 hours at 1,000° F. The product analyzed 0.9 weight percent sodium, 61.7 weight percent silica, 17.2 weight percent rare earth oxide and 18.9 weight percent alumina. The composites were allowed to equilibrate at room temperature with atmospheric water at about 50 percent relative humidity prior to X-ray analysis.

The REX-containing reference composites were prepared in a similar manner. The REX zeolite component was prepared from commercially available Linde Zeolite X which was thrice exchanged with an aqueous rare earth solution at 160° F. The weight ratio of total rare earth chloride to NaX was about 1. The final product, after washing, had about 1.2 weight percent exchangeable sodium. The weight percent RE$_2$O$_3$ was 26. After exchange, it was dried at 250° F. and steamed at 1,100° F. for 45 minutes in a flow of steam at one atmosphere. The moisture content of the resultant product was 2.1 weight percent.

In the case of both types of composites, X-ray analysis was performed by scanning from 7° twice angle theta to 5° twice angle theta. The peak height at 6.1° was measured in millimeters. The percent crystallinity is the $$\frac{\text{peak height of sample}}{\text{peak height of standard composite}} \times 100 \text{ percent.}$$

The 6.1 line was chosen because in these patterns it is the most prominent.

TABLE 6

Composition of Refinery Cycle Stock

| | | |
|---|---|---|
| Gravity, °API | 20.3 | |
| Specific Gravity | 0.9321 | |
| Aniline No. °F. | 141.0(mixed) | |
| Aromatics, Wt.% | | 51.9 |
| Pour Point | 55 | |
| Sulfur | 3.09 wt.% | |
| Nitrogen (Kjedahl) | | 0.047 wt.% |
| Carbon Residue (Conradson) | | 0.04 wt.% |
| Refraction Index at 20°C. | | 1.53887 |

ASTM Vacuum Assay (10mm)

| | | |
|---|---|---|
| 50% | 634 | 648 |
| 60% | 640 | 654 |
| 70% | 648 | 662 |
| 80% | 656 | 672 |
| 90% | 668 | 691 |
| EP | 700 | 708 |
| Percent Recovered (Vol.) | 98.5 | |
| Percent Residue (Vol.) | 1.3 | |
| Percent Loss (Vol.) | 0.2 | |

TABLE 7

Cracking Cycle Stock

Conditions 4LHSV, 1.5 Cat/oil, about 900°F., 10 min./run

| Catalyst | 3B | 3D |
|---|---|---|
| Steaming Hours[1] | 72 | 72 |
| Conversion, Vol.% | 30.2 | 34.6 |
| C$_5$+Gasoline, Vol.% | 23.6 | 27.5 |
| Total C$_4$'s, Vol.% | 5.7 | 6.0 |
| Dry Gas, wt.% | 3.3 | 3.6 |
| Coke, Wt.% | 1.3 | 1.4 |

[1] Steaming 72 hours at 1200° F. with steam at 15 psig.

A summary of crystallinity data taken from Table 5 is presented below:

| | | Crystallinity | |
|---|---|---|---|
| Catalyst | | Calcined | Steamed 24 Hours |
| Treatment | | | |
| Standard | A | 9.5% | 5.9 |
| Standard | B | 13.1% | 6.1 |
| Pre-Coked | C | 9.1% | 9.1 |
| Pre-coked | D | 8.3% | 7.9 |
| Saturated Gas Oil | E | 7.9% | 7.5 |
| Saturated Gas Oil | F | 7.1% | 7.5 |

These data clearly indicate that pre-saturating the REY with coke or with a heavy, waxy gas oil greatly improves cyrstallinity retention when the catalysts are exposed to steam. The crystallinity was calculated by use of X-ray diffraction patterns.

At the same time the attrition resistance (Lawson Shaker Attrition or LSA) is very high compared to the standard when the treated zeolite particles are subsequently milled as in 3E and 3F. The standard for these two forms gave the values of 270 and 418 seconds required to generate 50 weight percent fines whereas the catalyst prepared by coating with the heavy gas oil followed by ball milling gave attrition resistance measurements of 765 and 1310 for the two ion exchanged forms. Attrition resistance was determined in accordance with the method set forth in U.S. Pat. No. 3,301,794. to Cramer et al. entitled, "Process for Manufacturing Improved Catalytic Particles," Jan. 31, 1967, column 8, lines 37–63. Thus, from these measurements of the physical properties of catalysts prepared by the pre-coking technique of this invention, it is apparent that the composite catalyst is characterized by having a greater degree of dispersion of the sieve particles throughout the catalyst matrix. Such benefits have particular application in utilizing the catalyst in liquid phase hydrocarbon conversion reactions, especially hydrocracking and cracking of residua.

EXAMPLE 4

Two other samples were prepared using the composite forming process discussed under Example 3A above.

These preparations differ from the general process in that the REY component was derived from an aluminum-deficient sodium form of zeolite Y (NaY). Alumina removal from the NaY was achieved by treating 11.42 pounds of the sodium form of zeolite Y (43.8 percent solids at 1,000° F.), having a composition of Na, 10.3 weight percent $SiO_2$, 61.6 weight percent, $Al_2O_3$, 21.6 weight percent, $SiO_2/Al_2O_3$ 4.86, twice at 200° F. for 24 hours with an ethylenediaminetetraacetic acid solution $H_4$ EDTA, (442 g. $H_4$ EDTA in 4420 g. $H_2O$). This aluminum deficient sodium zeolite Y was then contacted three times with a $RECl_3·6H_2O$ solution. Each of the three contacts was for 1 hour duration at 200° F. using 1 equivalent rare earth per equivalent sodium per contact assuming a starting sodium level of 7 weight percent. Actually, 916 g. $RECl_3·6H_2O$ in 52 pounds water were used in each contact. After each contact, the sieve was washed with 4 liters of water and dried at 270° F. overnight for about 20 hours. The final composition of this $H_4$ EDTA treated and $RECl_3·6H_2O$ exchanged NaY was 0.26 percent Na, 16.6 percent $Al_2O_3$, 16.8 percent $(RE)_2O_3$, and 62.1 percent $SiO_2$, thus the $SiO_2/Al_2O_3$ molar ratio was 6.3. Prior to use in the forming operation, the aluminum-deficient REY was calcined for 10 hours at 1,000° F.

The bead-forming operation for this example consisted of first mixing the following solutions:

Silicate Solution
Solution A
12.2 pounds Q-Brand sodium silicate (28.9 weight percent $SiO_2$, 8.9 weight percent $Na_2O$ 62.2 weight percent water)
1.75 pounds water
Solution B
0.542 pounds calcined REY (described above in this example)
2.87 pounds of A-3 $Al_2O_3$ fines
10.52 pounds water
9.43 g. Marasperse N
Solution B was ball-milled for 4 hours.
Solution B was added to Solution A.
Sp. Gr. 1.272 at 79° F.
Acid Alum Solution
57.10 pounds $H_2O$
4.23 pounds $Al_2(SO_4)_3·18H_2O$
1.98 pounds $H_2SO_4$ (97 percent)
Sp. Gr. 1.059 at 75

These solutions were mixed together through a nozzle adding the 384 ml. per minute of silicate solution at about 70° F. to 326 ml. per minute acid alum flow at 40° F., forming a hydrosol having a 2.3 second gel time at 67° F. and a pH of 8.4. The calculated composition at this point after calcining at 1,000° F. was 7.6 weight percent REY, 40.0 weight percent A-3 alpha alumina which had been previously calcined at about 1,200° C. in a matrix of 94.5 percent $SiO_2$ and 5.4 percent $Al_2O_3$.

The resulting bead hydrogel was processed continuously with a 1.4 weight percent $(NH_4)_2SO_4$ solution as discussed under Example 3A.

Physical, chemical and catalytic properties of this catalyst Sample 4A are summarized in the table below.

The catalyst Sample 4B was prepared by a process essentially identical to that used in Sample 4A, differing only in that the aluminum deficient REY was coked by saturation with Mid-Continent gas oil followed by heating at 750° F. until all vapors were removed.

The catalysts were steamed for 24 hours at 1,200° F. and under a steam pressure of 15 psig. prior to evaluation. The results of cracking the Mid-Continent gas oil are set forth in Table 8.

TABLE 8.—BEAD CATALYST PREPARATION WITH ALUMINUM DEFICIENT CRYSTALLINE ALUMINOSILICATE

[Evaluated with Mid-Continent gas oil]

| | Catalyst | |
|---|---|---|
| | 4A | 4B |
| Steaming, in hours | 24 | 24. |
| Forming pH | 8.4 | 8.4. |
| Description: | | |
| Matrix | Si/Al 94% | $SiO_2$–6% $Al_2O_3$. |
| Fines: | | |
| ¹Type | Standard REY | Pre-coked REY. |
| Conc | 7.5 | 7.5. |
| ²Type | $A_3Al_2O_3$ | $A_3Al_2O_3$. |
| Conc | 40 | 40. |
| Base Exchange: | | |
| Solution | | $(NH_4)_2SO_4$ |
| Conc., weight percent | 1.4 | |
| Composition: | | |
| Na, weight percent | 0.08 | 0.10. |
| $(RE)_2O_3$, weight percent | 1.24 | 1.28. |
| Physical properties: Surface area, m.²/g | 116 | 111. |
| Catalytic evaluation [Mid-Continent gas oil]: | | |
| Conditions, LHSV | 4 | 4. |
| Conditions, C/O | 1.5 | 1.5. |
| Conversion, volume percent | 49.0 | 52.7. |
| $C_5$ plus gasoline, volume percent | 44.0 | 46.2. |
| Total C4's, volume percent | 8.1 | 9.9. |
| Dry gas, weight percent | 4.2 | 4.4. |
| Coke, weight percent | 1.1 | 1.1. |
| $H_2$, weight percent | 0.01 | 1.1. |
| Diffusivity | 59 | 30.6. |
| LSA (attrition resistance) | 256 | 1,600. |

These data again show that the activity of the catalyst is very substantially improved by pre-coking the catalyst prior to the compositing step in its preparation. Further, they show again the tremendous improvement in attrition resistance resulting from the pre-coking step. Notice, in this connection, that the ball milling operation was used for both catalysts.

EXAMPLE 5

The following catalysts will serve to illustrate the preparation of fluid catalysts containing the coke pretreated sieve component.

Catalyst 5C was prepared by dispersing REY crystalline aluminosilicate into a 60 percent $SiO_2$–40 percent clay matrix. The preparation details consist of first dispersing 2.08 pounds of kaolin (McNamee) clay in 46 pounds water then adding 9.15 pounds N-Brand sodium silicate (28.9 weight percent $SiO_2$, 8.9 weight percent $Na_2O$, 62.7 weight percent $H_2O$). This dispersion is heated to 120° F. and acidified with $H_2SO_4$ with 165 ml. conc. $H_2SO_4$ (97 weight percent). The reaction mixture was held for 2 hours at 140° F. After this initial aging, the pH was reduced to about 4.2 with additional $H_2SO_4$ (requiring another 162 ml. con. $H_2SO_4$). This mixture was allowed to cool to room temperature overnight while stirring.

To this silica-clay matrix slurry was then added 220 g. calcined chelated REY (same as that used in Example 4A). The REY was dispersed in 660 cc. water containing 66 g. $RECl_3·6BY2O$ prior to addition to the silica-clay matrix slurr This slurry containing the REY was then spray dried with inlet temperature of 650° F. and outlet temperature of 280° F.

Product composition calculated from components at this point was 10 percent REY and 90 percent silica-clay matrix (60 percent SiO$_2$—40 percent clay).

The final spray-dried product was base exchanged with a 5 percent (NH$_4$)$_2$SO$_4$, using about 15 gallons of solution for about 2 quarts of fluid catalyst, washed essentially free of sulfate ion, dried at 250° F. for 24 hours.

This catalyst was evaluated both under two distinct test conditions as summarized in the Table below. To be evaluated at the first set of conditions, it was necessary to pellet the fluid catalyst then calcine it at 1,000° F. for 10 hours followed by steaming at 1,200° F. with steam at 15 psig. for 24 hours. For fluid evaluation this fluid catalyst was calcined for 10 hours at 1,000° F. then steamed for 4 hours at 1,400° F. with steam at atmospheric pressure.

The finished catalyst had a residual sodium of 0.06 weight percent and a (RE)$_2$O$_3$ content of 1.24 weight percent. After the 15 psig. steaming at 1,200° F., the surface area was 136 while after the 1,400° F., 4 hour steam treat, the surface area was 187 m$^2$/g.

Catalyst 5D was prepared in essentially the same manner as that described for sample 5C differing only in that the same aluminum-deficient REY was first coked at 750° F. with Mid-Continent Wide-range gas oil. Catalysts 5A and 5B were prepared in the same manner as Catalysts 5C and 5D with the exception that only 5 weight percent rare earth zeolite Y was incorporated into the catalysts.

The residual sodium content of this preparation 5D was 0.10 weight percent Na and a (RE)$_2$O$_3$ content of 1.86. The surface area of the pelleted catalyst steamed 24 hours at 1,200° F. with 15 psig. steam was 178 m$^2$/g. while the steamed fluid catalyst treated at 1,400° F. for 4 hours with steam at atmospheric pressure had a surface data of 190 m$^2$/g.

TESTS OF FLUID TYPE CATALYSTS*

| Catalyst | A | B | C | D |
|---|---|---|---|---|
| Percent REY | 5 | 5 | 10 | 10 |
| Pre-Coked | No | Yes | No | Yes |
| Surface Area (m$^2$/g) | 162 | 170 | | 178 |

Static Bed Test (4 LHSV, 1.5 C/O)

| | A | B | C | D |
|---|---|---|---|---|
| Conversion (vol.%) | 25.7 | 30.6 | 38.5 | 47.9 |
| Gasoline (C$_5$+) (vol.%) | 21.1 | 28.4 | 34.8 | 42.8 |
| Total C$_4$'s (vol.%) | 3.3 | 4.3 | 6.3 | 7.9 |
| Dry Gas (wt.%) | 2.2 | 2.4 | 3.1 | 3.7 |
| Coke (wt.%) | 0.7 | | | |

Fluid Catalytic Cracking-Test (5 LHSV, 5 C/O, 2.4 minutes, about 925°F., 1 atmosphere)

| | A | B | C | D |
|---|---|---|---|---|
| Conversion (vol%) | 67.6 | 73.9 | 77.0 | 82.1 |
| Gasoline (C$_5$+) (vol.%) | 57.6 | 61.8 | 61.9 | 62.5 |
| Total C$_4$'s(vol.%) | 13.6 | 15.6 | 17.7 | 20.2 |
| Dry Gas (wt.%) | 5.8 | 6.6 | 7.6 | 8.7 |
| Coke (On Charge) (Wt.%) | 2.2 | 2.6 | 3.4 | 5.1 |
| Coke (On Catalyst) (Wt.%) | 0.38 | 0.44 | 0.58 | 0.87 |

*The catalysts were steamed 24 hours at 1200° F. and 15 psig. for the static bed runs and 4 hours at 1400° F. and atmospheric pressure for the Fluid Catalytic Cracking-Test.

Once again the gain in activity obtained by the pre-coking technique is substantial. One very interesting phenomenon to note is that in the fluidized cracking test, the pre-coked catalyst having 5 percent REY gives as much gasoline as the non-coked catalyst having 10 percent REY. At the same time its product distribution is much better, i.e., much less dry gas and coke are formed. Probably Catalyst D would look much better in the fluid test at higher space velocity conditions.

Cracking, utilizing catalysts, described herein, can be carried out at catalytic cracking conditions employing a temperature within the approximate range of 700° to 1,200° F. and under a pressure ranging from sub-atmospheric pressure up to several hundred atmospheres. The contact time of the oil within the catalyst is adjusted in any case according to the conditions, the particular oil feed and the particular results desired to give a substantial amount of cracking to lower boiling products. Cracking may be affected in the presence of the instant catalyst utilizing well-known techniques including, for example, those wherein the catalyst is employed as a fluidized mass or as a compact particle-form moving bed, as well as in a static bed, or riser cracker.

Employing a catalytically active catalyst prepared by the present invention containing a hydrogenation component, heavy petroleum residua stocks, cycle stocks, and other hydrocrackable charged stocks can be hydrocracked at temperatures between 425° F. and 950° F. using molar ratios of hydrogen and hydrocarbon charge in the range between 2 and 80. The pressure employed will vary between 10 and 2,500 psig. and the liquid hourly space velocity between 0.1 and 10.

Similarly using such a catalyst, reforming stocks can be reformed employing a temperature between 700° F. and 1,000° F. The pressure can be between 100 and 1000 psig., but is preferably between 200 and 700 psig. The liquid hourly space velocity is generally between 0.1 and 10, preferably between 0.5 and 4 and the hydrogen to hydrocarbon mole ratio is generally between 1 and 20, preferably between 4 and 12.

From the foregoing, it is apparent that the coating technique of the present invention provides significant advantages in the catalyst preparation providing catalysts which are capable of greater conversion in cracking of hydrocarbon stocks and in greater selectivity in cracking cycle stocks which are difficult for conventional catalysts to crack at a high conversion rate. The catalyst prepared by the present technique provides these better selectivities after being treated with steam which treatment simulates conditions which cracking catalysts would undergo after a period of time in a conventional catalytic cracking unit. Additionally, the method of this invention provides improved dispersion of the sieve particles in the porous matrix and improves the attrition resistance of the catalyst so prepared. Accordingly, the present process is highly valuable for preparing catalysts to be used in refineries. It will also be noted that the method of this invention can be performed using relatively inexpensive coating materials normally available at the refinery site. The process can be used to improve properties of dessicants or adsorbents in which case it is not necessary that the alkali metal content be greatly reduced by ion exchange.

The advantages obtained when fluid and pelletted catalysts are prepared using sugar- and starch-coated zeolites are clearly shown by comparing the following pairs of Examples -- 6 and 7, 8 and 9, and 10 and 11. Examples 6, 8 and 10 use non-coated zeolites whereas 7, 9 and 11 utilize sugar- and starch-coated zeolites. The fluid catalyst matrix employed in the following preparations was made to contain 60 weight percent silica and 40 weight percent clay. The aqueous slurry of silica-clay mixture is partially neutralized with H$_2$SO$_4$ then heat treated at 140° F. for 2 hours followed by further acid neutralization to 4.5–4.8 pH. The active component is incorporated into this slurry at this point followed by spray drying, processing by exchange with (NH$_4$)$_2$SO$_4$ and then dehydrating and steaming.

EXAMPLE 6

In preparing this catalyst 2.48 pounds of Georgia kaolin clay, 86.5 weight percent solids, was dispersed in 52.2 pounds water. To this clay dispersion was added 10.98 pounds N-Brand sodium silicate, 28.9 weight percent SiO$_2$ — 8.9 weight percent Na$_2$O, while stirring vigorously. This mixture was then heated to 120° F. at which point 198 cc of concentrated H$_2$SO$_4$ (97.6 percent) was added over a half hour period. After this initial partial neutralization, the mixture was heated at 140° F. for 2 hours. After this heat treatment, the mixture was further neutralized with concentrated H$_2$SO$_4$ to a pH of 4.5-4.8 requiring an additional 195 cc of acid.

To the above matrix slurry was added a ballmilled rare earth Y crystalline aluminosilicate which is equal to 10 weight percent active component on final catalyst basis. The rare earth Y crystalline aluminosilicate was prepared by exchanging a commercially available sodium Y aluminosilicate semi-continuously at about 160°–180° F. with rare earth chloride hexahydrate to a residual sodium content of 3.19 weight percent. This active component was further calcined continuously in a rotary calciner at about 1,200° F. prior to wet milling 4 hours with an equal weight of kaolin clay. In the ballmilling step, 350 g. of the calcined REY was wet milled for 4 hours with 350 g. Georgia kaolin clay in 2,800 cc water with some dispersant. A sufficient amount of this milled slurry was dispersed in the above silica-clay matrix mixture to give 10 weight percent active REY in the final catalyst.

The final mixture of matrix and active component was subsequently dried in a spray dryer with an air inlet temperature of about 550° F. and an outlet temperature of 300° F.

Processing of the spray dried product involved 2 slurry contacts with excess water followed by settling and decantation. After this initial water wash the product was contacted continuously with a 5 weight percent $(NH_4)_2SO_4$ solution, charging 15 gals. over a 12" bed, in a 4–5 hour period and then water washing continuously until essentially free of sulfate ions. An additional exchange with $RECl_3 \cdot 6H_2O$ (59 g. $RECl_3 \cdot 6H_2O$ in 5,000 cc water, 1½ hour contact at room temperature) was used to replenish exchanged rare earth.

The final catalyst had a residual sodium content of 0.12 weight percent and an $(RE)_2O_3$ content of 2.1 weight percent.

EXAMPLE 7

This example was prepared by the method described in detail under Example 6 differing in that the active calcined rare earth crystalline aluminosilicate was wet milled with added sugar and $RECl_3 \cdot 6H_2O$. The wet milling details involve milling 350 g. of calcined REY (3.19 percent Na), 350 g. Georgia kaolin clay, 117 g. $RECl_3 \cdot 6H_2O$, 88 g. sugar in 2,800 cc water for 4 hours. Enough of this milled slurry, 3,040 g., was used to give 10 weight percent active component in the final catalyst.

Matrix preparation, crystalline aluminosilicate dispersion, catalyst processing and activation were essentially similar to that described in Example 6.

The final catalyst had a residual sodium content of 0.06 percent and an $(RE)_2O_3$ content of 2.2 percent.

Prior to evaluation, the catalysts were first calcined at 1,000° F. then steamed. One sample, in each case, was steamed at 1,400° F. for 4 hours at atmospheric pressure and another for 5 hours at 15 psig.

Comparative catalytic data summarized in Table 9 show the catalytic advantages for catalyst Example 7, which was prepared with sugarcoated crystalline aluminosilicate, in both activity and selectivity. It gave higher conversion at the same condition for the same crystalline aluminosilicate content, and produced a higher level of gasoline ($C_5^+$), 63.5 vs. 59.9, at about the same coke make on charge, 2.4 weight percent compared to 2.2.

Furthermore, it should be apparent that the catalyst containing sugarcoated REY was also more stable to severe steam treat (5 hours at 1,400° F. with 15 psig steam) still showing a high activity after the steam treat.

In the following pair of examples the advantage of other carbohydrates, such as starch, as coating materials is clearly shown.

EXAMPLE 8

In preparing the catalyst of this example, the method outlined in Example 6 was followed incorporating an active component (rare earth Y crystalline aluminosilicate having 3.1 weight percent Na) that was calcined in the laboratory at 1,300° F. for one-half hour into a silica-clay matrix.

The final catalyst had a residual sodium content of 0.05 and an $(RE)_2O_3$ content of 2.0 weight percent.

This final catalyst was steamed and evaluated as described under Example 6. Catalytic evaluation data are summarized in Table 10.

EXAMPLE 9

The silica-clay matrix used in this catalyst was prepared as described under Example 6. The active component employed in preparing this example was the same starting rare earth Y crystalline aluminosilicate used in Example 8. This active component as wet cake 1,120 g. (44.5 percent solids at 1,000° F.) was mixed with 50 g. starch dissolved in 700 cc. water, and then heated at 900° F. for 10 hours to insure complete coking of the starch coating. Enough of this active component was dispersed in water with added dispersant and mixed into the silica-clay matrix as described in Example 6. This mixture was spray dried, washed, exchanged with $(NH_4)_2SO_4$ and $RECl_3 \cdot 6H_2O$, dried, calcined and steamed as described under Example 6.

The final catalyst had a residual sodium content of 0.04 and an $(RE)_2O_3$ content of 2.66 weight percent.

Catalytic evaluation data comparing Example 8 (containing uncoated active component) and Example 9 (containing the starch coated active component) are summarized in Table 10. These catalytic data again show the advantages for surface coating the active component prior to dispersing in a matrix. Catalyst (Example 9) of exceptional activity and selectivity can be prepared as is apparent from data in Table 10.

The following catalysts were prepared in extruded form employing the same active components used in preparing Examples 6 and 7. Enough was added to produce a composite containing 10 weight percent REY. This active component was mixed with clay and extruded into three-sixteenths inch pellets.

EXAMPLE 10

In preparing this example, 79.2 g. (63.2 percent solids at 1,000° F.) of the same active component, wet milled rare earth Y crystalline aluminosilicate — clay mixture, used in preparing Example 6, was blended with 231 grams of Georgia kaolin clay (86.4 weight percent solids), 85 cc water in a muller mixer. This wet mixture was extruded hydraulically through a die having 3/16" holes, requiring 7-10 ton pressure on the 4 inch diameter piston. The extrudate was cut into ¼ inch length, dried at 230° F., calcined for 10 hours at 1,000° F. followed by steaming at 1,200° F. and 15 psig for 24 hours.

The final steamed catalyst had a surface area of 56 $m^2/g$.

The steamed catalyst was evaluated for catalytic cracking of a Wide Cut Mid-Continent gas oil at 4 LHSV, 1.5 C/O, 875° F. with a 10 minute run. Catalytic results are summarized in Table 11.

EXAMPLE 11

This example was prepared as described under Example 10 differing in that the active component was the same sugar-coated material used in fluid catalyst Example 7. In preparing this catalyst, 79.2 g. of the active component (63.2 weight percent solids), 231 g. Georgia kaolin clay (86.4 weight percent solids at 1,000° F.) and 85 cc water were mixed in a muller mixer, extruded, sized, dried, calcined and steamed as described in Example 10.

The final steamed catalyst, having a surface area of 58 $m^2/g$, was evaluated as described in Example 10.

Catalytic data presented in Table 11 clearly show the catalytic advantages resulting from the sugar surface coating. Catalyst (Example 11) has a much higher activity — 70.3 volume percent as compared to 58.5. In addition, the higher yield is obtained at only a slight increase in coke pointing out the advantages in selectivity.

TABLE 9.—COMPARATIVE CATALYTIC EVALUATION OF SILICA-CLAY MATRIX CATALYST CONTAINING SUGAR COATED REY AND UNCOATED REY

| Catalyst of Examples | 6 | 7 |
|---|---|---|
| Description: | | |
| Matrix | Silica-clay 60/40 | |
| Fines (1): | (¹) | (²) |
| Type | ³ REY | ³ REY |
| Conc | 10 | 10 |
| (2): | | |
| Type | Clay (Georgia kaolin) | |
| Conc | 10 | 10 |
| Composition: | | |
| Na, weight percent | 0.12 | 0.06 |
| (RE)₂O₃, weight percent | 2.10 | 2.2 |
| Physical properties steamed: | | |
| SF4 | 172 | 185 |
| PSF5 | 138 | 143 |

4 hr. steam treat at 1,400° F. Steam at 0 p.s.i.g.

| Catalytic evaluation stock | Wide cut mid-continent gas oil | |
|---|---|---|
| Conditions: | | |
| WHSV | 8.3 | 8.3 |
| C/O | 3 | 3 |
| Temperature, °F | ⁴ 922 | ⁴ 924 |
| Conversion, volume percent | 7.15 | 74.9 |
| C₅+gasoline, weight percent | 59.9 | 63.5 |
| Total C₄'s, volume percent | 15.2 | 15.7 |
| Dry gas, weight percent | 5.8 | 6.1 |
| Coke, weight percent | 2.2 | 2.4 |
| H₂, weight percent | 0.02 | 0.01 |

5 hr. stream treat at 1,400° F. Steam at 15 p.s.i.g.

| Catalytic evaluation stock | Wide cut mid-continent gas oil | |
|---|---|---|
| Conditions: | | |
| WHSV | 8.34 | 8.34 |
| C/O | 3 | 3 |
| Temperature, °F | ⁴ 927 | ⁴ 924 |
| Conversion, volume percent | 67.6 | 71.5 |
| C₅+gasoline, volume percent | 59.7 | 63.0 |
| Total C₄'s, volume percent | 12.7 | 12.7 |
| Dry gas, weight percent | 4.9 | 5.4 |
| Coke, weight percent | 1.7 | 1.8 |
| H₂, weight percent | 0.01 | 0.002 |

¹ REY and clay milled together for 4 hours in aqueous slurry along with minor amount of dispersant for 4 hours.
² REY and clay milled with RECl₃·6H₂O and sugar in aqueous slurry for 4 hours.
³ 3.19 wt. percent Na.
⁴ 2.4 min. run.

NOTE:
SF4—steamed for 4 hours at 1,400° F. and 0 p.s.i.g.
PSF5—steamed for 5 hours at 1,400° F. and 15 p.s.i.g.
WHSV—weight hourly space velocit

TABLE 10

| Example | 8 | 9 |
|---|---|---|
| Description: | | |
| Matrix | Silica-clay 60/40 | |
| Fines (1): | | |
| Type | ¹ REY | ² REY |
| Conc | 10 | 10 |
| Fines (2): | | |
| Type | | |
| Conc | | |
| Composition: | | |
| Na, wt. percent | 0.05 | 0.04 |
| (RE)₂O₃, wt. percent | 2.0 | 2.66 |
| Physical properties surface area, m.²/g. steamed: | | |
| SF4 | | 210 |
| PSF5 | 157 | 171 |

Steam treat 4 hrs. at 1,400° F. with 0 p.s.i.g. steam

| Catalytic evaluation stock | Wide cut mid-continent gas oil | |
|---|---|---|
| Conditions: | | |
| WHSV | 8.3 | 8.34 |
| C/O | 3 | 3.0 |
| Temp., °F | 924 | 924 |
| Conv., vol. percent | 73.5 | 79.7 |
| C₅+ gasoline, vol. percent | 64.6 | 66.9 |
| Total C₄'s, vol. percent | 12.5 | 16.3 |
| Dry gas, wt. percent | 5.5 | 6.5 |
| Coke, wt. percent | 2.6 | 2.9 |
| H₂, wt. percent | 0.01 | 0.02 |

Steam treat 5 hrs. at 1,400° F. with 15 p.s.i.g. steam

| Catalytic evaluation stock | Wide cut mid-continent gas oil | |
|---|---|---|
| Conditions: | | |
| WHSV | 8.3 | 8.3 |
| C/O | 3.0 | 3.0 |
| Temp., °F | 927 | 924 |
| Conv., vol. percent | 70.1 | 75.6 |
| C₅+ gasoline, vol. percent | 62.9 | 64.8 |
| Total C₄'s, vol. percent | 12.1 | 14.3 |
| Dry gas, wt. percent | 4.9 | 6.1 |
| Coke, wt. percent | 2.0 | 2.2 |
| H₂, wt. percent | 0.01 | 0.01 |

Table 10—Continued

¹ Rare earth Y CAS prepared exchanging a commercial sodium Y semi-continuously with RECl₃·6H₂O at 160-180° F. until residual Na is down to 3.1 wt. percent. Wet cake dried, and calcined ½ hr. at 1,300° F.
² Same REY as in (¹) but wet cake mixed with 10 wt. percent starch on dry basis, coked at 900° F. then dispersed in water.

TABLE 11.—COMPARISON OF EXTRUDED CATALYST CONTAINING UNCOATED AND STARCH COKE COATED REY

| Catalyst of Examples | 10 | 11 |
|---|---|---|
| Steaming: | | |
| Description: | | |
| Matrix | Georgia kaolin clay | |
| Fines: | | |
| (1) Type | ¹ REY | ² REY |
| Conc | 10 | 10 |
| Physical properties surface area, m.²/g. steamed | 56 | 58 |
| Catalytic evaluation | Wide cut mid-continent gas oil | |
| Conditions: | | |
| LHSV | 4 | 4 |
| C/O | 1.5 | 1.5 |
| Temp., °F | 875 | 875 |
| Conversion, vol. percent | 58.5 | 70.3 |
| C₅+ gasoline, vol. percent | 48.4 | 59.7 |
| Total C₄'s, vol. percent | 14.0 | 13.5 |
| Dry gas, wt. percent | 4.7 | 6.0 |
| Coke, wt. percent | 2.3 | 2.6 |
| H₂, wt. percent | 0.01 | 0.01 |

¹ Plant calcined REY 3.19 wt. percent Na milled with equal wt. clay for 4 hours in aqueous slurry with some dispersant.
² Same as (¹) but milled with added sugar and RECl₃·6H₂O.

The terms and expressions used herein are used for purposes of description and not of limitation, as there is no intention, in the use of such terms al.

8. A method according to claim 7 wherein said zeolite contains less than about 1 weight percent exchangeable alkali metal and has a pore size greater than about 4 angstroms.

9. A method according to claim 7 wherein the surfaces of the zeolite component are coated apart from the matrix.

10. A method according to claim 7 wherein the surface of one of said components is coated in the presence of the other of said components.

11. A method according to claim 7 wherein the quantity of gas oil corresponds to that which would fill at least 10 percent of the pore volume of a catalytically active zeolite.

12. A method according to claim 7 wherein the quantity of gas oil corresponds to that which would fill at least 50 percent of the pore volume of a catalytically active zeolite.

13. A process according to claim 4 wherein said zeolite is chosen from the group consisting of Zeolite X and Zeolite Y.

14. A process according to claim 8 wherein said zeolite is chosen from the group consisting of X and Y.

15. A process according to claim 13 wherein said zeolite has at least some of its cations exchanged into a rare earth form.

16. A process according to claim 4 wherein said zeolite is in its hydrogen form.

17. A process according to claim 6 wherein said porous matrix is an inorganic oxide material chosen from the group consisting of porous inorganic oxides, mixtures and compounds thereof.

18. A process according to claim 15 wherein said inorganic oxide is predominantly silica.

19. A process according to claim 17 wherein said inorganic oxide is predominantly alumina.

20. A process according to claim 17 wherein said inorganic oxide material is a silica-alumina gel.

21. A process according to claim 17 wherein the inorganic oxide component is a clay material chosen from the group consisting of raw clays, chemically treated clays and thermally treated clays.

22. A method according to claim 1 wherein the coating is formed by contacting the surface of the zeolite with a saccharide and treating the so coated zeolite to form a carbonaceous coating on the zeolite.

23. A method according to claim 21 wherein the zeolite is contacted with an aqueous sugar solution and the so treated zeolite is heated at a temperature between the decomposition point of the sugar and the decomposition point of the zeolite.

24. A method according to claim 22 wherein the zeolite is contacted with an aqueous suspension of a starch and the so treated zeolite is thereafter heated at a temperature between the decomposition point of the starch and the decomposition point of the zeolite.

25. A method according to claim 23 wherein the temperature is between 300° and 1,200° F.

26. A method according to claim 24 wherein the temperature is between 300° and 1,200° F.

27. A method according to claim 22 wherein the saccharide is a monosaccharide.

28. A method according to claim 22 wherein the saccharide is a polysaccharide.

29. A method according to claim 22 wherein the saccharide is a disaccharide.

30. A composition prepared by the method of claim 1.
31. A composition prepared by the method of claim 3.
32. A composition prepared by the method of claim 4.
33. A composition prepared by the method of claim 7.
34. A composition prepared by the method of claim 13.
35. A composition prepared by the method of claim 22.

36. A method for converting a hydrocarbon charge which comprises contacting said hydrocarbon charge under hydrocarbon conversion conditions with a catalyst comprising the composition of claim 30.

37. A method for cracking a hydrocarbon charge which comprises contacting said hydrocarbon charge under cracking conversion conditions with a catalyst comprising the composition of claim 32.

38. A method for cracking a hydrocarbon charge which comprises contacting said hydrocarbon charge under cracking conversion conditions with a catalyst comprising the composition of claim 33.

39. A method for cracking a hydrocarbon charge which comprises contacting said hydrocarbon charge under cracking conversion conditions with a catalyst comprising the composition of claim 35.

40. A method for hydrocracking a hydrocarbon charge which comprises contacting said hydrocarbon charge under hydrocracking conditions with a catalyst comprising the composition of claim 35.

41. A method for cracking which comprises contacting said hydrocarbon charge under cracking conditions which include a temperature within the range or 700° to 1,200° F. and a pressure ranging from subatmospheric pressure up to several hundred atmospheres with a catalyst comprising the composition of claim 30.

42. A method of hydrocracking which comprises contacting said hydrocarbon charge under hydrocracking conditions including a temperature between 425° F. and 950° F., a hydrogen to hydrocarbon mole ratio in the range between 2 and 80, a pressure between 10 and 2,500 psig. and a liquid hourly space velocity between 0.1 and 10 with a catalyst comprising the composition of claim 30.

43. A method of preparing a composition comprising a catalytically active porous amorphous material and a porous matrix material which comprises coating at least a portion of the external surface of said porous amorphous material with a coating material selected from the group consisting of polystyrene, wax, carbonaceous material derived from a saccharide, sulfur, coke and gas oil which is substantially retained during any subsequent wet processing steps prior to being intentionally removed, intimately compositing said porous amorphous material with said matrix material and removing said coating material.

44. A method according to claim 43 wherein said porous amorphous material comprises an inorganic oxide.

* * * * *

PO-1050
(5/69)

UNITED STATES PATENT OFFICE
CERTIFICATE OF CORRECTION

Patent No. 3,676,330    Dated July 11, 1972

Inventor(s) Charles J. Plank and Edward J. Rosinski

It is certified that error appears in the above-identified patent and that said Letters Patent are hereby corrected as shown below:

| | |
|---|---|
| Column 7, line 8 | "the" combining should be --then-- combining |
| Column 7, line 13 | "RECl$_3$.6BY2O" should be --RECl$_3$.6H$_2$O-- |
| Column 7, line 49 | "(10%Rey)" should be --(10%REY)-- |
| Column 10, line 4 | "A;$_2$Al$_4$)$_3$" should be --Al$_2$(SO$_4$)$_3$-- |
| Column 10, line 15-16 | "3.0 wt% Al$_2$O$_3$ matrix 94.2 weight 49.4 wt% SiO$_2$ percent SiO$_2$-5.8 weight percent Al$_2$O$_3$" should read --3.0 wt % Al$_2$O$_3$) matrix 94.2 weight 49.4 wt% SiO$_2$ ) percent SiO$_2$ - 5.8 ) weight percent ) Al$_2$O$_3$-- |
| Column 11, 1st para. | First paragraph should begin after Table 5 in Column 11, not before |
| Table 5, column 3B, 72 | "5.4" should be --4.4-- |
| Table 5, last line Column 3B, second No. | "413" should be --418-- |
| Column 11, 12, Table 6 | Table 6 split up into sections, should be together |

- 1 -

UNITED STATES PATENT OFFICE
CERTIFICATE OF CORRECTION

Patent No. 3,676,330      Dated July 11, 1972

Inventor(s) Charles J. Plank and Edward J. Rosinski

It is certified that error appears in the above-identified patent and that said Letters Patent are hereby corrected as shown below:

| | |
|---|---|
| Table 8, last line | "256" should be --254-- |
| Column 14, line 73 | "RECl$_3$.6BY2O" should be --RECl$_3$.6H$_2$O-- |
| Column 14, line 73 | "slurr" should be --slurry-- |
| Column 15, line 34 | "data" should be --area-- |
| Column 15, line 48 | after "0.7" insert --0.9  0.9  1.2-- |
| Column 19, line 35 | "0.002" should be --0.02-- |
| Column 19, line 43 | "velocit" should be --velocity-- |
| Column 20, line 31 | after "terms" delete "al." and insert --and expressions, of excluding any equivalent or portions thereof, as many modifications and departures are possible within the scope of the invention claimed.-- |
| Column 20, line 32 | insert the word --CLAIMS-- and insert the following claims: |

1. A method of preparing a composition comprising a crystalline zeolite and a porous matrix material which comprises coating at least a portion of the surface of said zeolite or said porous matrix material with a coating material selected from the group consisting of polystyrene, wax, carbonaceous material derived from a saccharide, sulfur, coke and gas oil which is substantially retained during any subsequent wet-processing

PO-1050 (5/69)

UNITED STATES PATENT OFFICE
CERTIFICATE OF CORRECTION

Patent No. 3,676,330                    Dated July 11, 1972

Inventor(s) Charles J. Plank and Edward J. Rosinski

It is certified that error appears in the above-identified patent and that said Letters Patent are hereby corrected as shown below:

steps prior to positive removal, which occurs after the compositing steps, intimately compositing said zeolite with said matrix material and removing said coating material.

2. A method of preparing a catalytic composition according to Claim 1 comprising a zeolite contained in and distributed throughout a porous matrix which comprises coating a substantial portion of the surfaces of at least one of the components selected from the group consisting of said zeolite and the material comprising said matrix apart from the other component with a substance capable of preventing intimate contact between the surfaces of said zeolite and porous matrix material upon intermixture of the same, thereafter combining said zeolite and matrix material and subsequently removing said substance from the resulting composite.

3. A method according to Claim 2 wherein the component which is coated is a crystalline zeolite.

4. A method of preparing a catalytic composition according to Claim 3 wherein said zeolite contains less than about 1 weight percent exchangeable alkali metal and a pore size greater than 4 Angstroms.

5. A method according to Claim 3 wherein the quantity of coating material added is at least 1 percent by weight based on the weight of the zeolite component.

PO-1050
(5/69)

UNITED STATES PATENT OFFICE
CERTIFICATE OF CORRECTION

Patent No. 3,676,330              Dated July 11, 1972

Inventor(s) Charles J. Plank and Edward J. Rosinski    - 4 -

It is certified that error appears in the above-identified patent and that said Letters Patent are hereby corrected as shown below:

6. A method according to Claim 3 in which the quantity of coating material added corresponds to the amount which would fill at least 10 percent of the pore volume of the zeolite component.

7. A method of preparing a composition comprising a crystalline zeolite and a porous matrix material which comprises coating at least a portion of the surface of said zeolite or said porous matrix material with an adherent gas oil which is substantially retained during any subsequent wet-processing steps prior to its positive removal, intimately compositing said zeolite with said matrix material and removing said coating material.

| | |
|---|---|
| Column 20, claim 8 | "4 angstroms" should be --4 Angstroms-- |
| Column 20, claim 17 | "claim 6" should be --Claim 5-- |
| Column 20, claim 18 | "claim 15" should be --Claim 17-- |
| Column 20, claim 23 | "claim 21" should be --Claim 22-- |
| Column 22, claim 41 line 3 | "range or" should be --range of-- |

Signed and sealed this 9th day of January 1973.

(SEAL)
Attest:

EDWARD M. FLETCHER, JR.            ROBERT GOTTSCHALK
Attesting Officer                   Commissioner of Patents